United States Patent
Ishizu et al.

(10) Patent No.: US 10,377,851 B2
(45) Date of Patent: Aug. 13, 2019

(54) LIQUID CRYSTAL POLYMER

(71) Applicant: UENO FINE CHEMICALS INDUSTRY, LTD., Osaka-shi, Osaka (JP)

(72) Inventors: Shinobu Ishizu, Kawanishi (JP); Hisanari Fujiwara, Kobe (JP); Akihito Ota, Sanda (JP)

(73) Assignee: UENO FINE CHEMICALS INDUSTRY, LTD., Osaka (JP)

( * ) Notice: Subject to any disclaimer, the term of this patent is extended or adjusted under 35 U.S.C. 154(b) by 69 days.

(21) Appl. No.: 15/511,308

(22) PCT Filed: Sep. 8, 2015

(86) PCT No.: PCT/JP2015/075449
§ 371 (c)(1),
(2) Date: Mar. 15, 2017

(87) PCT Pub. No.: WO2016/043091
PCT Pub. Date: Mar. 24, 2016

(65) Prior Publication Data
US 2017/0291988 A1    Oct. 12, 2017

(30) Foreign Application Priority Data

Sep. 19, 2014 (JP) ................................. 2014-191592
Jun. 30, 2015 (JP) ................................. 2015-130813

(51) Int. Cl.
*C08G 63/60* (2006.01)
*C08G 63/02* (2006.01)
(Continued)

(52) U.S. Cl.
CPC ........... *C08G 63/605* (2013.01); *C08G 63/02* (2013.01); *C08K 3/013* (2018.01); *C08K 5/0008* (2013.01);
(Continued)

(58) Field of Classification Search
None
See application file for complete search history.

(56) References Cited

U.S. PATENT DOCUMENTS 3,994,567 A * 11/1976 Matsuo .................. C09K 19/56
252/299.4
7,179,401 B2 * 2/2007 Ueno .................... C08G 63/065
252/299.01
(Continued)

FOREIGN PATENT DOCUMENTS

JP      63-161020 A    7/1988
JP      3-152124 A     6/1991
(Continued)

OTHER PUBLICATIONS

English translation of JP03152124. (Year: 1991).*
(Continued)

*Primary Examiner* — Cynthia H Kelly
*Assistant Examiner* — Anna Malloy
(74) *Attorney, Agent, or Firm* — Sughrue Mion, PLLC (57) ABSTRACT

A resin does not need to incorporate a fluorescent substance and exhibits fluorescence itself. Also, a liquid crystal polymer is provided which does not contain a bleeding out substance such as hydrophobic silica and barium sulfate and which has an effect of suppressing fibrillation in the resin itself. A liquid crystal polymer includes a copolymer of a polymerizable monomer (A) selected from the group consisting of pyromellitic acid or anhydride thereof and a reactive derivative thereof and a polymerizable monomer (B).

19 Claims, 2 Drawing Sheets

(51) Int. Cl.
*C08L 67/00* (2006.01)
*C08K 3/013* (2018.01)
*C08K 5/00* (2006.01)
*C09K 11/06* (2006.01)
*C09K 19/38* (2006.01)

(52) U.S. Cl.
CPC .............. *C08L 67/00* (2013.01); *C09K 11/06* (2013.01); *C09K 19/3809* (2013.01); *C09K 2211/1416* (2013.01); *C09K 2211/1425* (2013.01); *C09K 2211/1433* (2013.01)

(56) References Cited

U.S. PATENT DOCUMENTS

| | | | |
|---|---|---|---|
| 8,778,222 | B2 | 7/2014 | Matsubara et al. |
| 8,784,683 | B2 * | 7/2014 | Matsubara ............... C08K 7/14 252/299.01 |
| 8,834,741 | B2 | 9/2014 | Shiraishi et al. |
| 2014/0163146 | A1 * | 6/2014 | Hsu ........................ C09K 19/56 524/112 |

FOREIGN PATENT DOCUMENTS

| | | | | | |
|---|---|---|---|---|---|
| JP | 03152124 | A | * | 6/1991 | |
| JP | 4-285666 | A | | 10/1992 | |
| JP | 9-31177 | A | | 2/1997 | |
| JP | 2002-371127 | A | | 12/2002 | |
| JP | 2002371127 | A | * | 12/2002 | ........... C08G 63/065 |
| JP | 2004-250536 | A | | 9/2004 | |
| JP | 2010-106165 | A | | 5/2010 | |
| JP | 2013-122062 | A | | 6/2013 | |
| JP | 2013-122063 | A | | 6/2013 | |
| JP | 2013122063 | A | * | 6/2013 | ............... C08K 7/14 |
| JP | 2013-166848 | A | | 8/2013 | |
| JP | 5695389 | B2 | | 4/2015 | |
| JP | 2016-65228 | A | | 4/2016 | |
| JP | 2016-132248 | A | | 7/2016 | |
| WO | 2015/083759 | A1 | | 11/2015 | |

OTHER PUBLICATIONS

International Preliminary Report on Patentability with translation of Written Opinion dated Mar. 21, 2017 in counterpart International Application No. PCT/JP2015/075449.
International Search Report dated Oct. 13, 2015 issued by the International Searching Authority in PCT/JP2015/075449.
Hiroaki Yoshimizu et al., "Magnetic Orientation and Gas Diffusion Properties of Layered Structures of Liquid Crystalline Copolyesters with Alkyl Side Chains of Different Length", Japanese Journal of Polymer Science and Technology, vol. 71, No. 7, Jul. 2014, pp. 325-333. (10 pages total).
Masato Sone et al., "Rigid-Rod Polyesters with Flexible Side Chains Based on 1,4-Dialkylesters of Pyromellitic Acid. 2", Proceedings of Japanese Liquid Crystal Conference, vol. 18, Sep. 9, 1992, pp. 252-253. (3 pages total).
Communication dated Apr. 11, 2018 from the European Patent Office in counterpart Application No. 15842265.9.
Communication dated Sep. 5, 2018, from Japanese Patent Office in Application No. 2015-130813; 11 pages total (including translation).

* cited by examiner

LIQUID CRYSTAL POLYMER

CROSS REFERENCE TO RELATED APPLICATIONS

This application is a National Stage of International Application No. PCT/JP2015/075449 filed Sep. 8, 2015 (claiming priority based on Japanese Patent Application Nos. 2014-191592 filed Sep. 19, 2014 and 2015-130813 filed Jun. 30, 2015), the contents of which are incorporated herein by reference in their entirety.

FIELD OF THE INVENTION

The present application claims the priority under the Paris Convention based on Japanese Patent Application No. 2014-191592 filed on Sep. 19, 2014 and Japanese Patent Application No. 2015-130813 filed on Jun. 30, 2015, the entire content of which is incorporated herein by reference.

The present invention relates to a novel liquid crystal polymer having fluorescence property, a composition containing the same, and a processed article such as a molded article, a fiber and a film thereof. The present invention also relates to a liquid crystal polymer in which fibrillation of a molded article is suppressed.

BACKGROUND ART

Conventionally, many organic fluorescent substances are used as a material for a fluorescent pigment. The fluorescent pigment can be produced by incorporating a fluorescent substance into a resin by kneading at a temperature not lower than the softening temperature of the resin.

A fluorescent pigment obtained by powdering a solid solution of a fluorescent substance soluble in an organic solvent and a synthetic resin is also known. Such a fluorescent pigment is obtained by kneading a fluorescent substance with a synthetic resin at a temperature not lower than a softening temperature of the synthetic resin using a kneader and by finely pulverizing after cooling. The resulted fluorescent pigment powder can be incorporated into a further resin by kneading at a temperature not lower than the softening temperature of the further resin to produce a fluorescent resin.

However, a conventional organic fluorescent pigment uses an organic compound having a low molecular weight as a fluorescent substance. When such a fluorescent pigment is kneaded into a resin to obtain a fluorescent resin, the bleeding phenomenon in which the fluorescent substance migrates to the surface of the resin with time tends to occur. In a fluorescent resin in which the bleeding phenomenon has occurred, there is a problem that a fluorescent substance is easily desorbed and the fluorescence intensity of the fluorescent resin decreases with time. A fluorescent substance which has migrated to the surface of a fluorescent resin may be transferred to an object which contacts with the fluorescent resin, and color transfer occurs.

Patent Document 1 describes a process for reducing the bleeding phenomenon in which a fluorescent pigment having not a low molecular weight but a high molecular weight is synthesized and the resulted fluorescent pigment having a high molecular weight is kneaded into a resin. However, such a process is also the incorporation into the resin. Accordingly, a possibility that a bleeding phenomenon occurs still remains. In addition, such a process requires two steps of synthesizing a fluorescent pigment having a high molecular weight; and kneading with a resin to obtain a fluorescent resin.

Therefore, the development of a fluorescent resin which itself has fluorescence and does not cause a bleeding phenomenon is required.

A liquid crystal polymer is excellent in mechanical properties, moldability, chemical resistance, gas barrier properties, moisture resistance, electrical properties, etc. Accordingly, a liquid crystal polymer is used for components in various fields. Particularly, a liquid crystal polymer is excellent in heat resistance and thin-wall formability. Accordingly, the use of a liquid crystal polymer is expanding to electronic components such as precision instruments.

On the other hand, it is known in a molded article composed of a liquid crystal polymer that the surface of a resin is peeled off by ultrasonic cleaning or sliding with other members and the fuzzy phenomenon occurs. Hereinafter, the fuzzy phenomenon will be referred to as "fibrillation". In a precision instrument, especially an optical instrument with a lens, slight dust and dirty affect performance of the instrument. When small dust, oil, dirty and the like adhere to a lens in a component used for an optical instrument such as a camera module, the optical characteristics of the camera module is remarkably deteriorated.

In order to prevent such deterioration of the optical characteristics, a component constituting the camera module is usually subjected to the ultrasonic cleaning prior to assembly, and small dust, dirty and the like adhering to the surface are removed.

However, powder generated by the fibrillation on the surface of a molded article composed of a liquid crystal polymer in the ultrasonic cleaning as described above becomes foreign matter when assembling the camera module and when using the camera. As a result, there is a problem that the optical characteristics of a camera module are remarkably deteriorated.

As a process for suppressing the fibrillation, it is known to add an inorganic particle such as hydrophobic silica to a resin. However, there is a problem that an inorganic particle such as silica has a weak absorptivity with a resin and bleeds out. A fine particle bled out may be a foreign substance which deteriorates the optical characteristics of the camera module even if the fine particle is extremely minute and the amount thereof is very small.

Further, a liquid crystal polyester resin composition which suppresses the fibrillation by containing barium sulfate having a particle diameter of 1 µm or less is proposed (Patent Document 2). However, the resin composition contains barium sulfate in a large amount of 5 to 40 parts by volume. Also, the problem that barium sulfate bleeds out cannot be avoided.

Accordingly, there has been a need for a liquid crystal polymer which has an effect of suppressing the fibrillation and does not contain any substance which bleeds out.
Patent Document 1: JP-A-2004-250536
Patent Document 2: JP-B-5695389

SUMMARY OF THE INVENTION

An object of the invention is to provide a resin which does not need to incorporate a fluorescent substance and which itself shows fluorescence. A further object of the invention is to provide a liquid crystal polymer which does not contain any bleeding out substance such as hydrophobic silica or barium sulfate and which has an effect of suppressing the fibrillation in a resin itself.

As a result of intensive studies, the inventors have found that a liquid crystal polymer which has fluorescence and may suppress the fibrillation is obtained by copolymerizing pyromellitic acid with an other polymerizable monomer, and thus the invention has been completed.

That is, the invention relates to a liquid crystal polymer characterized in that the polymer is obtained by copolymerizing a polymerizable monomer (A) selected from the group consisting of pyromellitic acid or an anhydride thereof and a reactive derivative thereof and an other polymerizable monomer (B). Hereinafter, the polymer will be also referred to as a "liquid crystal polymer of the invention". Here, usually, pyromellitic acid is represented by the formula (I):

formula (I)

and an anhydride thereof is represented by the formula (II):

formula (II)

The invention is intended to provide the following embodiments.

[1] A liquid crystal polymer characterized in that the polymer is obtained by copolymerizing a polymerizable monomer (A) selected from the group consisting of pyromellitic acid or an anhydride thereof and a reactive derivative thereof and an other polymerizable monomer (B).

[2] The liquid crystal polymer according to [1], wherein the total amount of the polymerizable monomer (A) is from 0.01 to 10 parts by mole based on 100 parts by mole of the total amount of the other polymerizable monomer (B).

[3] The liquid crystal polymer according to [1], wherein the other polymerizable monomer (B) is one or more compounds selected from the group consisting of an aromatic hydroxycarboxylic acid, an aromatic dicarboxylic acid, an aromatic diol, an aromatic aminocarboxylic acid, an aromatic hydroxyamine, an aromatic diamine, an aliphatic diol and an aliphatic dicarboxylic acid.

[4] The liquid crystal polymer according to [1], wherein the other polymerizable monomer (B) contains an aromatic hydroxycarboxylic acid.

[5] The liquid crystal polymer according to [1], wherein the other polymerizable monomer (B) contains an aromatic hydroxycarboxylic acid, an aromatic dicarboxylic acid and an aromatic diol.

[6] The liquid crystal polymer according to [3], wherein the aromatic hydroxycarboxylic acid is 4-hydroxybenzoic acid and/or 2-hydroxy-6-naphthoic acid.

[7] The liquid crystal polymer according to [3], wherein the aromatic dicarboxylic acid is one or more compounds selected from the group consisting of terephthalic acid, isophthalic acid and 2,6-naphthalene dicarboxylic acid.

[8] The liquid crystal polymer according to [3], wherein the aromatic diol is one or more compounds selected from the group consisting of hydroquinone, resorcin, 4,4'-dihydroxybiphenyl and 2,6-dihydroxynaphthalene.

[9] The liquid crystal polymer according to [1], containing an inorganic or organic filler.

[10] An article selected from the group consisting of a molded article, a film and a fiber obtained by processing the liquid crystal polymer according to any one of [1] to [9].

[11] The liquid crystal polymer according to any one of [1] to [9], which is used for an electronic component.

[12] The liquid crystal polymer according to [11], wherein the electronic component is an electronic component for a sliding member.

[13] The liquid crystal polymer according to [11], wherein the electronic component is selected from the group consisting of a connector, a switch, a relay, a capacitor, a coil, a transformer, a camera module, an antenna and a chip antenna.

[14] The liquid crystal polymer according to [11], wherein the electronic component is a camera module.

[15] An electronic component containing the liquid crystal polymer according to [11].

Effects of the Invention

Since pyromellitic acid is incorporated into the polymer chain in the liquid crystal polymer of the invention as a polymerizable monomer, the polymer per se has fluorescence of a specific wavelength and no bleeding phenomenon occurs. That is, the liquid crystal polymer of the invention does not elute or desorb any fluorescent substance, so that the fluorescence intensity does not decrease with time and there is no transfer or color migration resulted from the fluorescent substance eluted on the surface. In addition, the inventors have separately developed a liquid crystal polymer which is composed of a specific monomer composition and emits light with a specific color tone by ultraviolet irradiation. In contrast, a liquid crystal polymer of the invention typically emits light in a color tone different from the above-mentioned color tone by ultraviolet irradiation, and contributes to the diversification of application of the liquid crystal polymer and the improvement of appearance of a product.

A liquid crystal polymer of the invention may be produced in a single step process and may be used as a resin for molding.

In addition, a liquid crystal polymer of the invention has an effect of suppressing the fibrillation on the surface of a molded article when the liquid crystal polymer is molded. Accordingly, the liquid crystal polymer of the invention may be suitably used as a resin for a component which requires the ultrasonic cleaning and an electronic component such as a sliding part which slides with other members.

BRIEF DESCRIPTION OF THE DRAWINGS

FIG. 1 is a diagram showing a fluorescence spectrum of a liquid crystal polymer of the invention (Example 5, 1.0 part by mole of pyromellitic acid with respect to 100 parts by mole of the polymerizable monomer (B)). Signals around 740 nm and 900 nm are unique signals due to the molecular structure of the liquid crystal polymer and the like.

FIG. 2 is a diagram showing a fluorescence spectrum of a liquid crystal polymer which does not contain pyromellitic acid (Comparative Example 3). Signals around 740 nm and 900 nm are unique signals due to the molecular structure of the liquid crystal polymer and the like.

EMBODIMENTS OF THE INVENTION

A liquid crystal polymer of the invention is a polyester or a polyesteramide forming an anisotropic melt phase, and is not particularly limited as long as it is referred to as a thermotropic liquid crystal polyester or a thermotropic liquid crystal polyester amide in the technical field.

The properties of an anisotropic melt phase may be confirmed by a conventional polarization inspection method utilizing crossed polarizers. More specifically, the confirmation of an anisotropic melt phase can be carried out by observing a sample placed on the Leitz hot stage at a magnification of 40 times in a nitrogen atmosphere using a Leitz polarization microscope. A liquid crystal polymer of the invention is optically anisotropic. That is, a liquid crystal polymer of the invention transmits light when the liquid crystal polymer is examined between crossed polarizers. If a sample is optically anisotropic, the sample transmits polarized light even in a stationary state.

In the present specification, a "reactive derivative" of a polymerizable monomer means a derivative of a monomer having the reactivity capable of introducing a constituent unit intended. Examples of the reactive derivative of pyromellitic acid which may be preferably used in the invention include an ester-forming derivative such as an alkyl-, alkoxy- or halogen-substituted derivative, an acyl derivative, an ester derivative and an acid halide of pyromellitic acid, and an ester-forming derivative such as an acylate, an ester derivative and an acid halide of the above-mentioned substituted derivative. An alkyl group or an alkoxy group having up to 6 carbon atoms is preferably used as a substituent. As a polymerizable monomer (A) selected from the group consisting of pyromellitic acid or an anhydride thereof and a reactive derivative thereof, only one kind of compound may be used, or two or more kinds of compounds may be used in combination.

In the present specification, "aromatic" is intended to mean a compound containing an aromatic group which may has a condensed ring number of up to 4. Furthermore, "aliphatic" is intended to mean a compound containing a saturated or unsaturated carbon chain having 2 to 12 carbon atoms which may have a branch.

In the present specification, a liquid crystal polymer which "has fluorescence of a specific wavelength" means a liquid crystal polymer which exhibits a fluorescence peak having a peak top in a wavelength range of 470 to 600 nm when the liquid crystal polymer is excited with light having a wavelength of 250 to 450 nm. In one embodiment, a liquid crystal polymer of the invention has a peak top in the range of 470 to 600 nm, preferably 480 to 590 nm, more preferably 490 to 580 nm when the liquid crystal polymer is excited with light having a wavelength of 250 to 450 nm.

The total amount of the polymerizable monomer (A) selected from the group consisting of pyromellitic acid or an anhydride thereof and the reactive derivative thereof to be used for a liquid crystal polymer of the invention is preferably 0.01 to 10 parts by mole, more preferably 0.03 to 5 parts by mole, further preferably 0.05 to 3 parts by mole, relative to 100 parts by mole of the total amount of the other polymerizable monomer (B). In an embodiment of the invention, the total amount of the polymerizable monomer (A) selected from the group consisting of pyromellitic acid or pyromellitic anhydride, and reactive derivatives thereof used in a liquid crystal polymer of the invention is preferably from 0.01 to 10 parts by mole, more preferably from 0.1 to 5 parts by mole, further preferably from 0.2 to 3 parts by mole, especially preferably from 0.35 to 2.5 parts by mole, relative to 100 parts by mole of the total amount of the other polymerizable monomers (B). When the total amount of the polymerizable monomer (A) is more than 10 parts by mole relative to 100 parts by mole of the total amount of the other polymerizable monomer (B), the resulting polymer tends to be crosslinked easily and the liquid crystallinity tends to be deteriorated. When the total amount of the polymerizable monomer (A) is less than 0.01 parts by mole relative to 100 parts by mole of the total amount of the other polymerizable monomer (B), the resulting polymer exhibits no fluorescence, or the fibrillation of the resulting polymer tends not to be suppressed.

Examples of the other polymerizable monomer (B) to be used for a liquid crystal polymer of the invention include a monomer used for a conventional liquid crystal polymer such as an aromatic hydroxycarboxylic acid, an aromatic dicarboxylic acid, an aromatic diol, an aromatic amino carboxylic acid, an aromatic hydroxyamine, an aromatic diamine, an aliphatic diol and an aliphatic dicarboxylic acid. Each of these compounds may be used alone, or two or more kinds thereof may be used in combination. Preferably, at least one monomer having a hydroxy group or an amino group is used.

As the other polymerizable monomer (B) to be used in a liquid crystal polymer of the invention, an oligomer obtained by bonding one or more of the above-mentioned compounds may be provided to the copolymerization with the polymerizable monomer (A) selected from the group consisting of pyromellitic acid or an anhydride thereof and a reactive derivative. Regarding the amount of the other polymerizable monomer (B) in the present specification and claims, even when the "polymerizable monomer" is used as an oligomer, each monomer unit constituting the oligomer shall be counted.

Examples of the aromatic hydroxycarboxylic acid include, for example, 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxyphenyl-4-benzoic acid, 3'-hydroxyphenyl-4-benzoic acid, 4'-hydroxyphenyl-3-benzoic acid and an alkyl-, alkoxy-, or halogen-substituted product thereof, as well as an ester-forming derivative such as an acylated product, an ester derivative and an acid halide of the above-mentioned compounds. Among them, 4-hydroxybenzoic acid or 2-hydroxy-6-naphthoic acid is preferably used alone or the combination of 4-hydroxybenzoic acid and 2-hydroxy-6-naphthoic acid is preferably used from the viewpoint that the heat resistance, the mechanical strength and the melting point of the resulting liquid crystal polymer may easily be adjusted.

Examples of the aromatic dicarboxylic acid include, for example, terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, 4,4"-dicarboxyterphenyl, bis(4-carboxyphenyl)ether, bis(4-carboxyphenoxy)butane, bis(4-carboxyphenyl)ethane, bis(3-carboxyphenyl)ether and bis(3-carboxyphenyl)ethane and an alkyl-, alkoxy-, or halogen-substituted product thereof, as well as an ester-forming derivative such as an ester derivative and an acid halide of the above-mentioned compounds.

Among these, terephthalic acid, isophthalic acid and 2,6-naphthalenedicarboxylic acid are preferably used, and especially, terephthalic acid is more preferably used from the viewpoint that the heat resistance of the resulting liquid crystal polymer may be effectively enhanced.

Examples of the aromatic diol include, for example, hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenyl ether, bis(4-hydroxyphenyl) ethane and 2,2'-dihydroxybinaphthyl and an alkyl-, alkoxy-, or halogen-substituted product thereof, as well as an ester-forming derivative such as an acylated product of the above-mentioned compounds.

Among these, hydroquinone, resorcin, 4,4'-dihydroxybiphenyl, and 2,6-dihydroxynaphthalene are preferably used, and especially, hydroquinone, 4,4'-dihydroxybiphenyl and 2,6-dihydroxynaphthalene are more preferably used from the viewpoint that the reactivity during the polymerization is excellent.

Examples of the aromatic aminocarboxylic acid include, for example, 4-aminobenzoic acid, 3-aminobenzoic acid, 6-amino-2-naphthoic acid and an alkyl-, alkoxy-, or halogen-substituted product thereof, as well as an ester-forming derivative such as an acylated product, an ester derivative and an acid halide of the above-mentioned compounds.

Examples of the aromatic hydroxyamine include, for example, 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenylmethane, 4-amino-4'-hydroxybiphenylsulfide and 2,2'-diaminobinaphthyl, an alkyl-, alkoxy-, or halogen-substituted product thereof, as well as an ester-forming derivative such as an acylated product of the above-mentioned compounds. Among these, 4-aminophenol is preferably used from the viewpoint that the balance may easily be established between the heat resistance and the mechanical strength of the resulting liquid crystal polymer.

Examples of the aromatic diamine include 1,4-phenylenediamine, 1,3-phenylenediamine, 1,5-diaminonaphthalene, 1,8-diaminonaphthalene, an alkyl-, alkoxy- or halogen-substituted products thereof, as well as an amide-forming derivative such as an acylated compound of the above-mentioned compounds.

Examples of the aliphatic diol include, for example, ethylene glycol, 1,4-butanediol, 1,6-hexanediol, and an acylated product thereof. An aliphatic diol containing a polymer such as polyethylene terephthalate or polybutylene terephthalate may be reacted with the aromatic hydroxycarboxylic acid, the aromatic dicarboxylic acid and the aromatic diol described above, as well as an acylated product, an ester derivative and an acid halide thereof.

Examples of the aliphatic dicarboxylic acid include, for example, oxalic acid, malonic acid, succinic acid, glutaric acid, adipic acid, pimelic acid, suberic acid, azelaic acid, sebacic acid and dodecanedioic acid. Among these, oxalic acid, succinic acid, adipic acid, suberic acid, sebacic acid and dodecanedioic acid are preferably used from the viewpoint that the reactivity during polymerization is excellent.

A liquid crystal polymer of the invention may be a liquid crystal polymer which contains a thioester bond within such a range that the purpose of the invention is not impaired. Examples of the monomer providing a thioester bond include a mercapto-aromatic carboxylic acid, an aromatic dithiol, an hydroxy-aromatic thiol, and the like. Preferably, the content of such a monomer is equal to or smaller than 10% by mole relative to the total amount of the other polymerizable monomer (B).

It is one of the preferred embodiments of the invention to use as the other polymerizable monomer (B) a combination of two or more compounds selected from the group consisting of an aromatic hydroxycarboxylic acid, an aromatic dicarboxylic acid, an aromatic diol, an aromatic aminocarboxylic acid, an aromatic hydroxyamine, an aromatic diamine, an aliphatic diol and an aliphatic dicarboxylic acid.

Among these polymerizable monomers, a combination including an aromatic hydroxycarboxylic acid is more preferably used, and a combination including an aromatic hydroxycarboxylic acid, an aromatic dicarboxylic acid and an aromatic diol is more preferably used.

Examples of the polymerizable monomer (B) used for a liquid crystal polymer of the invention include, for example, the combinations listed below.
1) 4-hydroxybenzoic acid/2-hydroxy-6-naphthoic acid,
2) 4-hydroxybenzoic acid/terephthalic acid/4,4'-dihydroxybiphenyl,
3) 4-hydroxybenzoic acid/terephthalic acid/isophthalic acid/4,4'-dihydroxybiphenyl,
4) 4-hydroxybenzoic acid/terephthalic acid/isophthalic acid/4,4'-dihydroxybiphenyl/hydroquinone,
5) 4-hydroxybenzoic acid/terephthalic acid/hydroquinone,
6) 2-hydroxy-6-naphthoic acid/terephthalic acid/hydroquinone,
7) 4-hydroxybenzoic acid/2-hydroxy-6-naphthoic acid/terephthalic acid/4,4'-dihydroxybiphenyl,
8) 2-hydroxy-6-naphthoic acid/terephthalic acid/4,4'-dihydroxybiphenyl,
9) 4-hydroxybenzoic acid/2-hydroxy-6-naphthoic acid/terephthalic acid/hydroquinone,
10) 4-hydroxybenzoic acid/2-hydroxy-6-naphthoic acid/terephthalic acid/hydroquinone/4,4'-dihydroxybiphenyl,
11) 4-hydroxybenzoic acid/2,6-naphthalenedicarboxylic acid/4,4'-dihydroxybiphenyl,
12) 4-hydroxybenzoic acid/terephthalic acid/2,6-naphthalenedicarboxylic acid/hydroquinone,
13) 4-hydroxybenzoic acid/2,6-naphthalenedicarboxylic acid/hydroquinone,
14) 4-hydroxybenzoic acid/2-hydroxy-6-naphthoic acid/2,6-naphthalenedicarboxylic acid/hydroquinone,
15) 4-hydroxybenzoic acid/terephthalic acid/2,6-naphthalenedicarboxylic acid/hydroquinone/4,4'-dihydroxybiphenyl,
16) 4-hydroxybenzoic acid/terephthalic acid/4-aminophenol,
17) 2-hydroxy-6-naphthoic acid/terephthalic acid/4-aminophenol,
18) 4-hydroxybenzoic acid/2-hydroxy-6-naphthoic acid/terephthalic acid/4-aminophenol,
19) 4-hydroxybenzoic acid/terephthalic acid/4,4'-dihydroxybiphenyl/4-aminophenol,
20) 4-hydroxybenzoic acid/terephthalic acid/ethylene glycol,
21) 4-hydroxybenzoic acid/terephthalic acid/4,4'-dihydroxybiphenyl/ethylene glycol,
22) 4-hydroxybenzoic acid/2-hydroxy-6-naphthoic acid/terephthalic acid/ethylene glycol,
23) 4-hydroxybenzoic acid/2-hydroxy-6-naphthoic acid/terephthalic acid/4,4'-dihydroxybiphenyl/ethylene glycol, and
24) 4-hydroxybenzoic acid/terephthalic acid/2,6-naphthalenedicarboxylic acid/4,4'-dihydroxybiphenyl.

Hereinafter, a production process of a liquid crystal polymer of the invention will be described.

The production process of a liquid crystal polymer of the invention is not especially limited, and the polymerizable monomer (A) selected from the group consisting of pyromellitic acid or an anhydride thereof, and a reactive derivative thereof and the other polymerizable monomer (B) may be provided to a publicly known polycondensation process such as a melt acidolysis process and a slurry polymerization process to obtain a liquid crystal polymer of the invention.

The melt acidolysis process is a preferred process for the production of a liquid crystal polymer of the invention. According to this process, a polymerizable monomer is firstly heated to form a melt solution of a reacting substance, and subsequently, the polycondensation reaction is continuously conducted to obtain a melted polymer. A vacuum may be applied to facilitate the removal of a volatile substance (for example, acetic acid and water) which is sub-generated in the final stage of the condensation.

The slurry polymerization process is a process of reacting polymerizable monomers in the presence of a heat exchanging fluid, and a solid product is obtained in the form of a suspension in which the solid product is suspended in a heat exchanging medium.

In the melt acidolysis process and the slurry polymerization process, the polymerizable monomer (A) and the other polymerizable monomer (B) used in the production of a liquid crystal polymer may also be provided to the reaction as a modified form obtained by the acylation of a hydroxyl group and/or an amino group at the normal temperature, that is, as a lower acylated product.

A lower acyl group having 2 to 5 carbon atoms is preferably used, and a lower acyl group having 2 or 3 carbon atoms is more preferably used. Especially preferably, a process in which an acetyl product of the above-mentioned polymerizable monomers is used in the reaction may be considered.

A lower acylated product of the polymerizable monomer may be a lower acylated product synthesized in advance by separately conducting the acylation or may be produced in a reaction system by adding an acylating agent such as an acetic anhydride into a polymerizable monomer when a liquid crystal polymer is produced.

In the melt acidolysis process and the slurry polymerization process, the polycondensation reaction may be conducted at a temperature of 150 to 400° C., preferably 250 to 370° C., at a normal pressure and/or a reduced pressure, and a catalyst may be used therein if necessary.

Examples of the catalyst include, for example, an organic tin compound such as a dialkyltin oxide (for example, dibutyltin oxide) and a diaryltin oxide; a titanium dioxide; an antimony trioxide; an organic titanium compound such as an alkoxytitanium silicate and a titanium alkoxide; an alkali metal salt and an alkaline-earth metal salt of a carboxylic acid (for example, a potassium acetate); and a gaseous acid catalyst such as a Lewis acid (for example, a boron trifluoride) and a hydrogen halide (for example, hydrogen chloride).

When a catalyst is used, the amount of the catalyst is preferably 1 to 1000 ppm, more preferably 2 to 100 ppm, relative to the total amount of the other polymerizable monomers (B).

The melt viscosity of a liquid crystal polymer of the invention is preferably 1 to 1000 Pa s, more preferably 5 to 300 Pa·s measured at a condition of a temperature of 320° C. and a shear velocity of 1000 $s^{-1}$ using a capillary rheometer.

A liquid crystal polymer obtained by conducting the polycondensation reaction as described above is usually removed in the molten state from a polymerization reaction tank and is thereafter processed into the form of pellets, flakes, or powder.

A liquid crystal polymer in the form of pellets, flakes or powder may be subjected to the thermal treatment substantially in the state of the solid phase at a reduced pressure, under vacuum, or in an atmosphere of an inert gas such as nitrogen and helium for the purposes of increasing the molecular weight to improve the heat resistance, and the like.

The temperature of the thermal treatment conducted in the state of the solid phase is not especially limited if a liquid crystal polymer does not melt, while the temperature of the thermal treatment is preferably 260 to 350° C., more preferably 280 to 320° C.

In a liquid crystal polymer of the invention obtained as described above, one or more kinds selected from the group consisting of an inorganic filler or an organic filler, a further additive and a further resin component described below may be blended to prepare a liquid crystal polymer composition. In the invention, a liquid crystal polymer composition containing various additives and a further resin may be simply referred to as a liquid crystal polymer. Examples of the liquid crystal polymer composition include a liquid crystal polymer composition containing a liquid crystal polymer of the invention and an inorganic filler or an organic filler.

Examples of the liquid polymer composition include a liquid polymer composition containing a liquid crystal polymer of the invention and an inorganic filler or an organic filler.

The inorganic or organic filler which may be blended in a liquid crystal polymer of the invention may be a fibrous, tabular or granular filler, for example, glass fiber, milled glass, silica alumina fiber, alumina fiber, carbon fiber, aramid fiber, potassium titanate whisker, aluminum borate whisker, wollastonite, talc, mica, graphite, calcium carbonate, dolomite, clay, glass flake, glass beads, barium sulfate, and titanium oxide. Among these, glass fiber is preferably used because the balance between the physical properties and the cost is excellent. Two or more of these fillers may be used in combination.

The total amount of an inorganic or organic filler in a liquid crystal polymer composition of the invention is preferably 1 to 200 parts by weight, more preferably 5 to 100 parts by weight, relative to 100 parts by weight of the liquid crystal polymer. When the total amount of the above-mentioned inorganic or organic filler exceeds 200 parts by weight, relative to 100 parts by weight of a liquid crystal polymer, the moldability of the liquid crystal polymer composition tends to be deteriorated and/or the abrasion of a cylinder and a mold in a molding machine tends to become significantly worn.

In a liquid crystal polymer of the invention, a further additive, for example, a mold release improving agent such as a higher fatty acid, a higher fatty acid ester, a higher fatty acid amide, a higher fatty acid metal salt, a polysiloxane, and a fluorine-containing resin; a coloring agent such as a dye and a pigment; an oxidation inhibitor; a thermal stabilizer; a UV absorbing agent; an antistatic agent; and a surfactant may be blended within such a range that the effect of the invention is not impaired. The higher fatty acid as used herein refers a fatty acid having 10 to 25 carbon atoms. A liquid crystal polymer composition may contain only one of these additives or two or more thereof in combination.

The total amount of further additives in a liquid crystal polymer composition of the invention is preferably 0.1 to 10 parts by weight, more preferably 0.5 to 5 parts by weight relative to 100 parts by weight of a liquid crystal polymer. When the total amount of further additives is larger than 10 parts by weight relative to 100 parts by weight of a liquid crystal polymer, the moldability of a liquid crystal polymer tends to be degraded, or the thermal stability tends to be deteriorated.

In the molding of a liquid crystal polymer or a liquid crystal polymer composition of the invention, an additive achieving an outer lubricant effect such as a higher fatty acid, a higher fatty acid ester, a higher fatty acid metal salt and a fluorocarbon-based surface active agent may in advance be adhered to the surface of pellets of a liquid crystal polymer.

A further resin component may be added to a liquid crystal polymer of the invention. Examples of the further resin component include, for example, a polyamide, a polyester, a polyacetal, a polyphenylene ether and a modified product thereof, as well as a thermoplastic resin such as a polysulfone, a polyethersulfone, a polyetherimide and a polyamideimide, and a thermosetting resin such as a phenol resin, an epoxy resin and a polyimide resin. Each of the further resin components may be contained alone, or two or more thereof may be contained in combination. The content of the further resin component is not especially limited and may be appropriately decided depending on the use or the purpose of a liquid crystal polymer. In one typical example, the total amount of the further resin components is from 0.1 to 100 parts by weight, in particular from 0.1 to 80 parts by weight, relative to 100 parts by weight of a liquid crystal polymer.

A liquid crystal polymer composition of the invention may be obtained by adding an inorganic filler or an organic filler, a further additive and a further resin component into a liquid crystal polymer and by melting and kneading them using a Bunbury mixer, a kneader, a single-screw, a twin-screw extruder or the like at a temperature between that in the vicinity of the crystal melting temperature of the liquid crystal polymer and the crystal melting temperature+100° C.

A liquid crystal polymer or a liquid crystal polymer composition of the invention obtained as described above may be processed into a molded article, a film, a fiber and the like using a publicly known processing method such as an injection-molding method, a compression molding method, an extrusion molding method and a blow molding method.

The liquid crystal polymer of the invention has a characteristic that the liquid crystal polymer itself has fluorescence, and such a characteristic is not found in the conventional liquid crystal polymer. Therefore, a molded article, a film, a fiber and the like composed of the liquid crystal polymer or the liquid crystal polymer composition of the invention may be preferably employed for the use of a reflector, an accessory and the like.

According to a liquid crystal polymer of the invention, the fibrillation is suppressed. Therefore, the liquid crystal polymer of the invention may be used in electronic components such as precision instruments. In particular, a liquid crystal polymer of the invention is preferably used in electronic components which require ultrasonic cleaning and electronic parts such as sliding parts which slide with other members.

Examples of the electronic component include a component selected from the group consisting of a connector, a switch, a relay, a capacitor, a coil, a transformer, a camera module, an antenna and a chip antenna.

Among them, a liquid crystal polymer of the invention prevents the deterioration of optical characteristics caused by the fibrillation on the surface of a molded article, and therefore is particularly preferably used as a component of a camera module. Examples of the component of the camera module include a lens barrel portion (a portion on which a lens rests), a mount holder portion (a portion to which a barrel is attached and fixed to a substrate), a frame of a CMOS (image sensor), a shutter and a shutter bobbin portion, an aperture ring, a stopper (a portion for pressing a lens) and the like.

EXAMPLES

The invention will be described in detail below with reference to Examples, while the present invention is not limited to Examples.

The characteristic values in the examples were measured by the following methods.

<Melt Viscosity>

The melt viscosity was measured at a condition of a shear velocity of 1000 s$^{-1}$ using a capillary of 0.7 mm$\phi$×10 mm by a melt viscosity measuring apparatus (Capilograph 1D from Toyo Seiki Co., Ltd.).

<Crystal Melting Temperature>

Using a differential scanning calorimeter (Exstar 6000 from Seiko Instruments Inc.), the temperature (Tm1) of the endothermic peak observed when the sample was measured under the condition of raising temperature from room temperature at a rate of 20° C./min was measured and then was held at a temperature 20 to 50° C. higher than Tm1 for 10 minutes. Subsequently, the sample was cooled down to room temperature under the condition of dropping temperature at a rate of 20° C./min, and an endothermic peak was observed when the sample was further measured again under the condition of raising temperature at a rate of 20° C./min, and the temperature at which the peak top was shown is defined as the crystal melting temperature (Tm).

<Deflection Temperature Under Load>

A strip shaped specimen (having a length of 127 mm×a width of 12.7 mm×a thickness of 3.2 mm) was formed using an injection molding machine (UH1000-110 from Nissei Plastic Industrial Co., Ltd.), and the temperature at which a predetermined amount of deflection (0.254 mm) was achieved was measured using the strip shaped specimen with a load of 1.82 MPa and at a temperature increasing rate of 2° C./min according to ASTM D648.

<Tensile Strength>

A dumbbell shaped specimen (having a length of 63.5 mm×a width of 3.5 mm×a thickness of 2.0 mm) was produced by conducting the injection molding at a cylinder temperature of the crystal melting temperature+20 to 40° C. and at a mold temperature of 70° C. using an injection molding machine with a clamping pressure of 15 t (MINI-MAT M 26/15 from Sumitomo Heavy Industries, Ltd.). The tensile strength thereof was measured at an interspan distance of 25.4 mm and a pulling rate of 5 mm/min using INSTRON 5567 (a universal testing machine from Instron Japan Co., Ltd.).

<Bending Strength and Bending Elastic Modulus>

A strip shaped specimen (having a length of 65 mm×a width of 12.7 mm×a thickness of 2.0 mm) was produced under the same conditions as those of the molded piece which was used for the measurement of the tensile strength. In the bending test, a three-point bending test was conducted with an interspan distance of 40.0 mm and a pulling rate of 1.3 mm/min using INSTRON 5567 (a universal testing machine from Instron Japan Co., Ltd.).

<Fluorescent Spectrum>

A molded piece with a smooth surface was prepared, and the fluorescence spectra were measured at an excitation wavelength of 373 nm and a scanning speed of 1200 nm/min using a spectrofluorophotometer F-4500 from HITACHI.

The value of the fluorescence peak wavelength indicates the wavelength of the peak top detected in the range of 400 to 700 nm.

<Evaluation of Fibrillation Using Eraser>

The surface of the molded piece used for the measurement of the bending strength was rubbed 30 round trips in the MD direction with an eraser specified in JIS S 6050, and the presence or absence of fibrils was confirmed visually. Poor: if fibrils were confirmed; Good: if fibrils were not confirmed.

<Evaluation of Fibrillation Using Ultrasonic Wave>

The specimen used for the measurement of the bending strength was immersed in an ultrasonic cleaning machine (Ultrasonic Cleaning Machine US-102 from SND Corporation Ltd.) containing distilled water, and the ultrasonic cleaning was conducted with an oscillating frequency of 38 kHz and an output of 100 W for 5 minutes. The presence or absence of fibrils was confirmed by the visual observation and a microscope on the resin surface after cleaning. Poor: if the fibrils were visually confirmed; Average: if the fibrils were not visually confirmed but were confirmed by a microscope; Good: if the fibrils were not confirmed even by a microscope.

Example 1

The following compounds were charged in a reaction vessel equipped with a stirring blade and a distillation tube, and the temperature was raised in a nitrogen gas atmosphere from 40 to 170° C. taking 1 hour and was kept at 170° C. for 30 minutes, and then was heated to 350° C. taking 7 hours. The reaction was further conducted at 350° C. for 10 minutes, and the pressure was reduced at 350° C. Subsequently, the pressure was reduced to 10 torr over 1.5 hours, and the polycondensation was completed when a predetermined stirring torque was reached. The content was removed from the reaction vessel and pellets of a liquid crystal polymer were obtained with a pulverizer. The amount of the distilled acetic acid during the polymerization was almost the same as the theoretical amount.

4-hydroxybenzoic acid: 70 parts by mole
2-hydroxy-6-naphthoic acid: 2 parts by mole
Hydroquinone: 14 parts by mole
2,6-naphthalenedicarboxylic acid: 14 parts by mole
Pyromellitic acid: 1.0 part by mole
Acetic anhydride: 105 parts by mole The resulted pellets were molded and evaluated for deflection temperature under load, tensile strength, bending strength and bending elastic modulus, fluorescence spectrum, and fibrillation. The results are shown in Table 1 together with the melt viscosity and the crystal melting temperature of the resulted resin.

Comparative Example 1

The following compounds were charged in a reaction vessel equipped with a stirring blade and a distillation tube and were subjected to the polycondensation and the molding in the same procedure as in Example 1, and deflection temperature under load, tensile strength, bending strength and bending elastic modulus, fluorescence spectrum, and fibrillation were evaluated. The results are shown in Table 1 together with the melt viscosity and the crystal melting temperature of the resulted resin.

4-hydroxybenzoic acid: 70 parts by mole
2-hydroxy-6-naphthoic acid: 2 parts by mole
Hydroquinone: 14 parts by mole
2,6-naphthalenedicarboxylic acid: 14 parts by mole
Acetic anhydride: 105 parts by mole

Example 2

The following compounds were charged in a reaction vessel equipped with a stirring blade and a distillation tube and subjected to the polycondensation and the molding in the same procedure as in Example 1, and deflection temperature under load, tensile strength, bending strength and bending elastic modulus and fibrillation were evaluated. The results are shown in Table 1 together with the melt viscosity and the crystal melting temperature of the resulted resin.

4-hydroxybenzoic acid: 70 parts by mole
2-hydroxy-6-naphthoic acid: 2 parts by mole
Hydroquinone: 14 parts by mole
2,6-naphthalenedicarboxylic acid: 14 parts by mole
Pyromellitic acid: 0.3 parts by mole
Acetic anhydride: 105 parts by mole

Example 3

The following compounds were charged in a reaction vessel equipped with a stirring blade and a distillation tube and were subjected to the polycondensation and the molding in the same procedure as in Example 1, and deflection temperature under load, tensile strength, bending strength and bending elastic modulus and fibrillation were evaluated. The results are shown in Table 1 together with the melt viscosity and the crystal melting temperature of the resulted resin.

4-hydroxybenzoic acid: 70 parts by mole
2-hydroxy-6-naphthoic acid: 2 parts by mole
Hydroquinone: 14 parts by mole
2,6-naphthalenedicarboxylic acid: 14 parts by mole
Pyromellitic acid: 0.5 parts by mole
Acetic anhydride: 105 parts by mole

TABLE 1

|  | Example 1 | Comparative Example 1 | Example 2 | Example 3 |
|---|---|---|---|---|
| addition amount of pyromellitic acid (part by mol) | 1.0 | 0 | 0.3 | 0.5 |
| melt viscosity (Pa · s) | 34 | 19 | 27 | 30 |
| temperature of viscosity measurement (° C.) | 350 | 350 | 350 | 350 |
| crystal melting temperature (° C.) | 315 | 326 | 320 | 318 |
| deflection temperature under load (° C.) | 247 | 277 | 255 | 251 |
| tensile strength (MPa) | 189 | 243 | 217 | 199 |
| bending strength (MPa) | 138 | 160 | 143 | 140 |
| bending elastic modulus (GPa) | 9 | 12 | 9 | 9 |
| fluorescence peak wavelength (nm) | 499 | 421 | — | — |
| evaluation of fibrillation using eraser | Good | Poor | Good | Good |
| evaluation of fibrillation using ultrasonic wave | Good | Poor | Average | Good |

As shown in Table 1, the liquid crystal polymers of Examples 1 to 3 in which pyromellitic acid was used as a monomer component were suppressed in fibrillation as compared with the liquid crystal polymer of Comparative Example 1 in which pyromellitic acid was not used as a monomer component. It can be understood that the liquid crystal polymers of Examples 1 to 3 had sufficient melt viscosity, crystal melting temperature, deflection temperature under load, tensile strength, bending strength and bending elastic modulus to use in a molded article such as an electronic component.

Example 4

The following compounds were charged in a reaction vessel equipped with a stirring blade and a distillation tube, and the temperature was raised in a nitrogen gas atmosphere from 40 to 170° C. taking 1 hour and was kept at 170° C. for 30 minutes, and then was heated to 350° C. taking 7.5 hours. The reaction was further conducted at 350° C. for 10 minutes, and the pressure was reduced at 350° C. Subsequently, the pressure was reduced to 10 torr over 1.5 hours, and the polycondensation was completed when a predetermined stirring torque was reached. The content was removed from the reaction vessel and pellets of a liquid crystal polymer were obtained with a pulverizer. The amount of the distilled acetic acid during the polymerization was almost the same as the theoretical amount.

4-hydroxybenzoic acid: 42 parts by mole
2-hydroxy-6-naphthoic acid: 16 parts by mole
Hydroquinone: 21 parts by mole
Terephthalic acid: 21 parts by mole
Pyromellitic acid: 1.0 parts by mole
Acetic anhydride: 103 parts by mole The resulted pellets were molded and evaluated for deflection temperature under load, tensile strength, bending strength and bending elastic modulus, fluorescence spectrum, and fibrillation. The results are shown in Table 2 together with the melt viscosity and the crystal melting temperature of the resulted resin.

Comparative Example 2

The following compounds were charged in a reaction vessel equipped with a stirring blade and a distillation tube and subjected to the polycondensation and the molding in the same procedure as in Example 4, and deflection temperature under load, tensile strength, bending strength and bending elastic modulus, fluorescence spectrum, and fibrillation were evaluated. The results are shown in Table 2 together with the melt viscosity and the crystal melting temperature of the resulted resin.

4-hydroxybenzoic acid: 42 parts by mole
2-hydroxy-6-naphthoic acid: 16 parts by mole
Hydroquinone: 21 parts by mole
Terephthalic acid: 21 parts by mole
Acetic anhydride: 103 parts by mole

TABLE 2

|  | Example 4 | Comparative Example 2 |
|---|---|---|
| addition amount of pyromellitic acid (part by mole) | 1.0 | 0 |
| melt viscosity (Pa · s) | 28 | 16 |
| temperature of viscosity measurement (° C.) | 350 | 350 |
| crystal melting temperature (° C.) | 321 | 326 |
| deflection temperature under load (° C.) | 200 | 219 |
| tensile strength (MPa) | 197 | 229 |
| bending strength (MPa) | 156 | 169 |
| bending elastic modulus (GPa) | 12 | 12 |
| fluorescence peak wavelength (nm) | 568 | 431 |
| evaluation of fibrillation using eraser | Good | Poor |
| evaluation of fibrillation using ultrasonic wave | Good | Poor |

As shown in Table 2, the liquid crystal polymer of Example 4 in which pyromellitic acid was used as a monomer component were suppressed in fibrillation as compared with the liquid crystal polymer of Comparative Example 2 in which pyromellitic acid was not used as a monomer component. It can be understood that the liquid crystal polymer of Example 4 had sufficient melt viscosity, crystal melting temperature, deflection temperature under load, tensile strength, bending strength and bending elastic modulus to use in a molded article such as an electronic component.

Example 5

The following compounds were charged in a reaction vessel equipped with a stirring blade and a distillation tube, and the temperature was raised in a nitrogen gas atmosphere from 40 to 170° C. taking 1 hour and was kept at 170° C. for 30 minutes, and then was heated to 330° C. taking 7 hours. The reaction was further conducted at 330° C. for 10 minutes, and the pressure was reduced at 330° C. Subsequently, the pressure was reduced to 10 torr over 1.5 hours, and the polycondensation was completed when a predetermined stirring torque was reached. The content was removed from the reaction vessel and pellets of a liquid crystal polymer were obtained with a pulverizer. The amount of the distilled acetic acid during the polymerization was almost the same as the theoretical amount.

Figure 1:
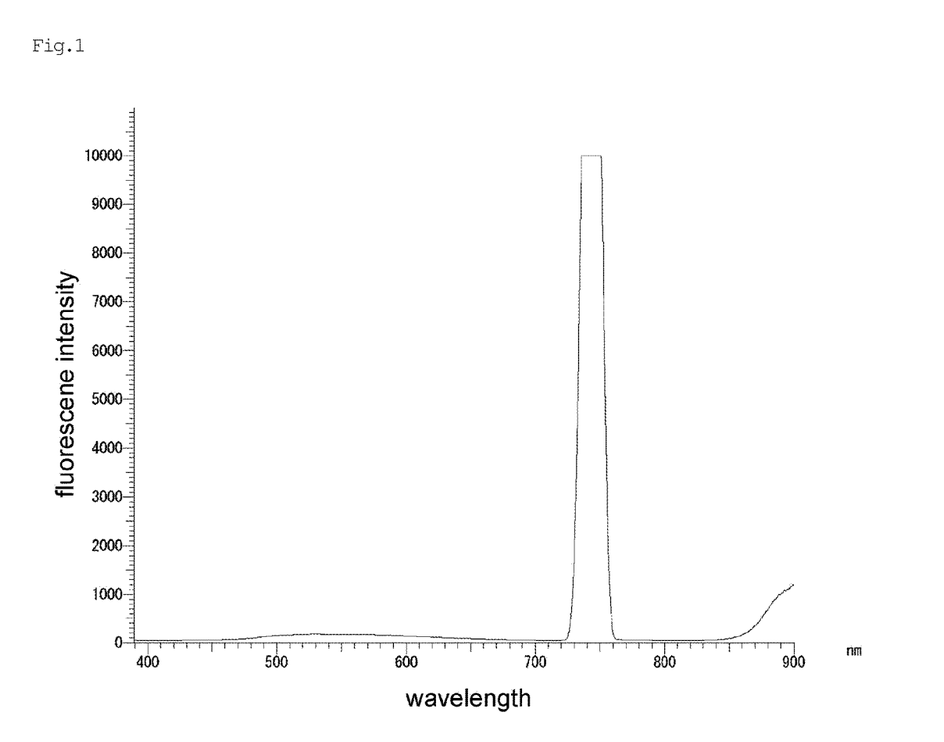

4-hydroxybenzoic acid: 73 parts by mole
2-hydroxy-6-naphthoic acid: 27 parts by mole
Pyromellitic acid: 1.0 part by mole
Acetic anhydride: 101 parts by mole The resulted pellets were molded and evaluated for deflection temperature under load, tensile strength, bending strength and bending elastic modulus, and fluorescence spectrum. The results are shown in Table 3 together with the melt viscosity and the crystal melting temperature of the resulted resin. The fluorescence spectrum is shown in FIG. 1.

Comparative Example 3

The following compounds were charged in a reaction vessel equipped with a stirring blade and a distillation tube and subjected to the polycondensation and the molding in the same procedure as in Example 5, and deflection temperature under load, tensile strength, bending strength and bending elastic modulus, and fluorescence spectrum were evaluated.

Figure 2:
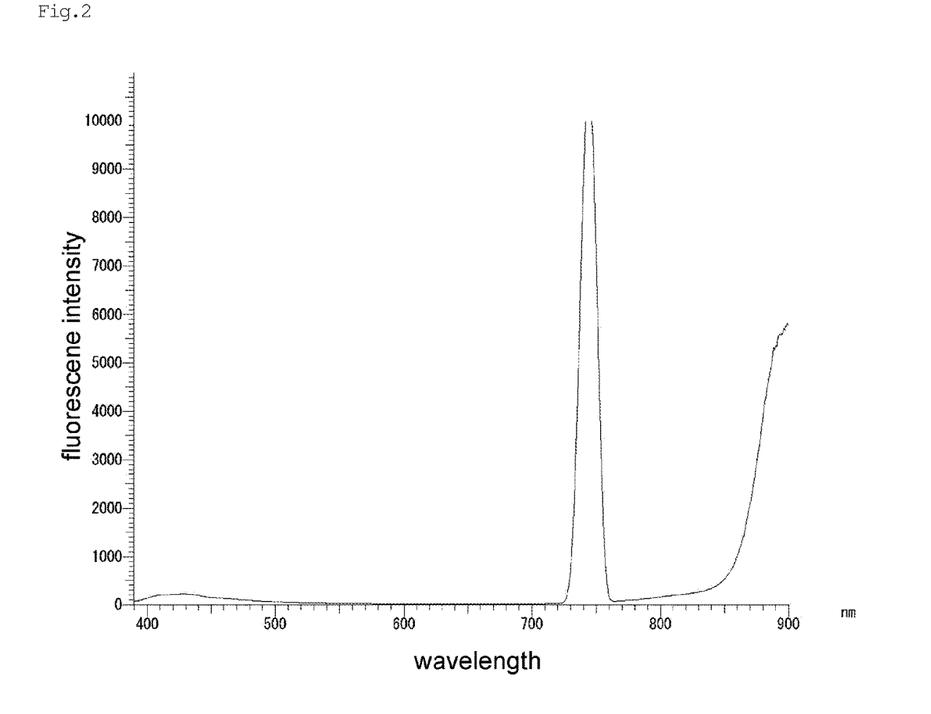

The results are shown in Table 3 together with the melt viscosity and the crystal melting temperature of the resulted resin. The fluorescence spectrum is shown in FIG. 2.

4-hydroxybenzoic acid: 73 parts by mole
2-hydroxy-6-naphthoic acid: 27 parts by mole
Acetic anhydride: 101 parts by mole

TABLE 3

|  | Example 5 | Comparative Example 3 |
|---|---|---|
| addition amount of pyromellitic acid (part by mol) | 1.0 | 0 |
| melt viscosity (Pa · s) | 26 | 25 |
| temperature of viscosity measurement (° C.) | 320 | 320 |
| crystal melting temperature (° C.) | 273 | 279 |
| deflection temperature under load (° C.) | 163 | 175 |
| tensile strength (MPa) | 271 | 266 |
| bending strength (MPa) | 170 | 160 |
| bending elastic modulus (GPa) | 12 | 12 |
| fluorescence peak wavelength (nm) | 530 | 429 |

Example 6

The following compounds were charged in a reaction vessel equipped with a stirring blade and a distillation tube, and the temperature was raised in a nitrogen gas atmosphere from 40 to 170° C. taking 1 hour and was kept at 170° C. for 30 minutes, and then heated to 350° C. taking 7.5 hours. The reaction was further conducted at 350° C. for 10 minutes, and the pressure was reduced at 350° C. Subsequently, the pressure was reduced to 5 torr over 1.5 hours, and the polycondensation was completed when a predetermined stirring torque was reached. The content was removed from the reaction vessel and pellets of a liquid crystal polymer were obtained with a pulverizer. The amount of the distilled acetic acid during the polymerization was almost the same as the theoretical amount.

4-hydroxybenzoic acid: 35 parts by mole
2-hydroxy-6-naphthoic acid: 5 parts by mole
Hydroquinone: 16 parts by mole
4,4'-biphenol: 14 parts by mole
Terephthalic acid: 30 parts by mole
Pyromellitic acid: 2.0 parts by mole
Acetic anhydride: 103 parts by mole The resulted pellets were molded and evaluated for deflection temperature under load, tensile strength, bending strength and bending elastic modulus, and fibrillation. The results are shown in Table 4 together with the melt viscosity and the crystal melting temperature of the resulted resin.

Comparative Example 4

The following compounds were charged in a reaction vessel equipped with a stirring blade and a distillation tube and subjected to the polycondensation and the molding in the same procedure as in Example 5, and deflection temperature under load, tensile strength, bending strength and bending elastic modulus, and fibrillation were evaluated. The results are shown in Table 4 together with the melt viscosity and crystal melting temperature of the resulted resin.

4-hydroxybenzoic acid: 35 parts by mole
2-hydroxy-6-naphthoic acid: 5 parts by mole
Hydroquinone: 16 parts by mole
4,4'-biphenol: 14 parts by mole
Terephthalic acid: 30 parts by mole
Acetic anhydride: 103 parts by mole

TABLE 4

|  | Example 6 | Comparative Example 4 |
|---|---|---|
| addition amount of pyromellitic acid (part by mole) | 2.0 | 0 |
| melt viscosity (Pa · s) | 33 | 20 |
| temperature of viscosity measurement (° C.) | 350 | 350 |
| crystal melting temperature (° C.) | 325 | 338 |
| deflection temperature under load (° C.) | 223 | 245 |
| tensile strength (MPa) | 151 | 140 |
| bending strength (MPa) | 122 | 150 |
| bending elastic modulus (GPa) | 9 | 9 |
| evaluation of fibrillation using eraser | Good | Poor |
| evaluation of fibrillation using ultrasonic wave | Good | Poor |

As shown in Table 4, the liquid crystal polymer of Example 6 in which pyromellitic acid was used as a monomer component were suppressed in fibrillation as compared with the liquid crystal polymer of Comparative Example 4 in which pyromellitic acid was not used as a monomer component. It can be understood that the liquid crystal polymer of Example 6 had sufficient melt viscosity, crystal melting temperature, deflection temperature under load, tensile strength, bending strength and bending elastic modulus to use in a molded article such as an electronic component.

The invention claimed is:

1. A liquid crystal polymer characterized in that the polymer is obtained by copolymerizing a polymerizable monomer (A) selected from the group consisting of pyromellitic acid or an anhydride thereof and a reactive derivative thereof and a polymerizable monomer (B),
    wherein the polymerizable monomer (B) consists of 4-hydroxybenzoic acid and 2-hydroxy-6-naphthoic acid, and
    wherein the liquid crystal polymer exhibits a fluorescence peak having a peak top in a wavelength range of 470 to 600 nm when the liquid crystal polymer is excited with light having a wavelength of 250 to 450 nm.

2. The liquid crystal polymer according to claim 1, wherein the total amount of the polymerizable monomer (A) is from 0.01 to 10 parts by mole based on 100 parts by mole of the total amount of the polymerizable monomer (B).

3. The liquid crystal polymer according to claim 1, containing an inorganic filler or an organic filler.

4. An article selected from the group consisting of a molded article, a film and a fiber obtained by processing the liquid crystal polymer according to claim 1.

5. An electronic component obtained by processing the liquid crystal polymer according to claim 1.

6. The electronic component according to claim 5, wherein the electronic component is an electronic component for a sliding member.

7. The electronic component according to claim 5, wherein the electronic component is selected from the group consisting of a connector, a switch, a relay, a capacitor, a coil, a transformer, a camera module, an antenna and a chip antenna.

8. The electronic component according to claim 5, wherein the electronic component is a camera module.

9. An electronic component containing the liquid crystal polymer according to claim 1.

10. A liquid crystal polymer characterized in that the polymer is obtained by copolymerizing a polymerizable monomer (A) selected from the group consisting of pyromellitic acid or an anhydride thereof and a reactive derivative thereof and a polymerizable monomer (B),
    wherein the polymerizable monomer (B) consists of 4-hydroxybenzoic acid, 2-hydroxy-6-naphthoic acid, an aromatic dicarboxylic acid and hydroquinone, and
    wherein the liquid crystal polymer exhibits a fluorescence peak having a peak top in a wavelength range of 470 to 600 nm when the liquid crystal polymer is excited with light having a wavelength of 250 to 450 nm.

11. The liquid crystal polymer according to claim 10, wherein the total amount of the polymerizable monomer (A) is from 0.01 to 10 parts by mole based on 100 parts by mole of the total amount of the polymerizable monomer (B).

12. The liquid crystal polymer according to claim 10, wherein the aromatic dicarboxylic acid is one or more compounds selected from the group consisting of terephthalic acid, isophthalic acid and 2,6-naphthalene dicarboxylic acid.

13. The liquid crystal polymer according to claim 10, containing an inorganic filler or an organic filler.

14. An article selected from the group consisting of a molded article, a film and a fiber obtained by processing the liquid crystal polymer according to claim 10.

15. An electronic component obtained by processing the liquid crystal polymer according to claim 10.

16. The electronic component according to claim 15, wherein the electronic component is an electronic component for a sliding member.

17. The electronic component according to claim 15, wherein the electronic component is selected from the group consisting of a connector, a switch, a relay, a capacitor, a coil, a transformer, a camera module, an antenna and a chip antenna.

18. The electronic component according to claim 15, wherein the electronic component is a camera module.

19. An electronic component containing the liquid crystal polymer according to claim 10.

* * * * *